United States Patent
Croussore et al.

(10) Patent No.: US 8,270,835 B2
(45) Date of Patent: Sep. 18, 2012

(54) METHOD AND SYSTEM FOR REDUCING CROSS-PHASE MODULATION IN AN OPTICAL SIGNAL

(75) Inventors: Kevin Croussore, San Jose, CA (US); Inwoong Kim, Allen, TX (US); Olga I. Vassilieva, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 276 days.

(21) Appl. No.: 12/751,548

(22) Filed: Mar. 31, 2010

(65) Prior Publication Data

US 2011/0243557 A1 Oct. 6, 2011

(51) Int. Cl.
*H04J 14/02* (2006.01)
*H04B 10/12* (2006.01)
*H04B 10/00* (2006.01)

(52) U.S. Cl. .......... 398/81; 398/147; 398/148; 398/158; 398/159

(58) Field of Classification Search ............... 398/81, 398/184

See application file for complete search history.

(56) References Cited

U.S. PATENT DOCUMENTS

| | | | |
|---|---|---|---|
| 6,873,798 B1 * | 3/2005 | Pilipetskii et al. | 398/81 |
| 7,609,969 B2 * | 10/2009 | Vassilieva et al. | 398/81 |
| 7,693,425 B2 * | 4/2010 | Vassilieva et al. | 398/147 |
| 7,991,295 B2 * | 8/2011 | Vassilieva et al. | 398/147 |
| 2007/0140700 A1 * | 6/2007 | Vassilieva et al. | 398/147 |
| 2008/0170639 A1 * | 7/2008 | Vassilieva et al. | 375/300 |
| 2008/0170861 A1 * | 7/2008 | Vassilieva et al. | 398/147 |
| 2008/0170862 A1 * | 7/2008 | Vassilieva et al. | 398/152 |
| 2009/0074417 A1 * | 3/2009 | Vassilieva et al. | 398/81 |
| 2009/0324224 A1 * | 12/2009 | Xie | 398/65 |
| 2011/0222864 A1 * | 9/2011 | Vassilieva | 398/158 |

OTHER PUBLICATIONS

Jeremier Renaudier; Impact of Temporal Interleaving of polarization tributaries onto 100-Gb/s coherent transmission systems with RZ pulse carving; Dec. 15, 2008; IEEE photonics technology letter vol. 20 No. 24; pp. 2036-2038.*
Chongjin Xie; Nonlinear polarization scattering impairments and mitigation in 10-Gbaud polarization division multiplexed WDM systems; 2009; OSA.*
100-Gb/s Dual polarization QPSK modulator with PLC-LN hybrid Configuration; 2009; Nippon Telegraph and Telephone corporation.*

(Continued)

*Primary Examiner* — Kenneth N Vanderpuye
*Assistant Examiner* — Amritbir Sandhu
(74) *Attorney, Agent, or Firm* — Baker Botts L.L.P.

(57) ABSTRACT

A method for reducing cross-phase modulation in an optical signal includes receiving an optical signal comprising a plurality of channels, wherein the information being communicated in a first set of one or more of the channels is modulated using one or more single-polarization modulation techniques and wherein the information being communicated in a second set of one or more of the channels is modulated using one or more dual-polarization modulation techniques. The method also includes splitting the optical signal into at least a first copy of the optical signal and a second copy of the optical signal and terminating the second set of channels in the first copy. Furthermore, the method includes applying a differential group delay to the second copy, the differential group delay introducing a walk-off between symbols communicated in a first polarization component of the second set of channels and the symbols of a second polarization component of the second set of channels. In addition, the method includes terminating the first set of channels in the second copy, combining the first set of channels in the first copy and the second set of channels in the second copy, and forwarding the combined channels.

14 Claims, 2 Drawing Sheets

OTHER PUBLICATIONS

Renaudier et al.; "Impact of Temoral Interleaving of Polarization Tributaries Onto 100-Gb/s Coherent Transmission Systems With RZ Pulse Carving"; IEEE Photonics Technology Letters, vol. 20, No. 24; pp. 2036-2038, Dec. 15, 2008.

Serena et al.; "Nonlinear Penalty Reduction Induced by PMD in 112 Gbit/s WDM PDM-QPSK Coherent Systems"; Univeritá degli Studi di Parma, Dept. Ingegneria dell'Informazione, v.le G. Usberti 181/A, 43100 Parma (Italy); pp. 2, 2009.

Xie et al.; "Nonlinear Polarization Scattering Impairments and Mitigation in 10-Gbaud Polarization-Division-Multiplexed WDM Systems"; OSA/OFC/NFOEC 2009; pp. 3, 2009.

Chongjin Xie; "WDM coherent PDM-QPSK systems with and without inline optical dispersion compensation"; Optics Express, vol. 17, No. 6; pp. 4815-4823, Mar. 16, 2009.

Olga I. Vassilieva; Patent Application, U.S. Appl. No. 12/723,156; "Method and System for Compensating for Optical Dispersion in an Optical Signal"; pp. 38, Mar. 12, 2010.

* cited by examiner

METHOD AND SYSTEM FOR REDUCING CROSS-PHASE MODULATION IN AN OPTICAL SIGNAL

TECHNICAL FIELD OF THE INVENTION

The present invention relates generally to optical networks and, more particularly, to a method and system for reducing cross-phase modulation in an optical signal.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity.

The data communicated in a optical signal (or a particular multiplexed channel thereof) may be modulated using a variety of different modulation techniques. Such techniques include, as examples, on-off keying (OOK) and return-to-zero (RZ) phase shift keying (PSK). Both of these modulation techniques produce single polarization (SP) signals. Other modulation techniques, such as dual polarization (DP) phase shift keying produce dual polarization signals. For example, dual polarization quadrature phase shift keying (DP-QPSK) modulation is being contemplated for use in modulating one hundred gigabit/second signals in next generation optical networks.

One issue that exists with DP signals is signal degradation due to cross-phase modulation (XPM). XPM causes the state of polarization of each symbol to rotate differently as the signal propagates in the optical fiber. This results in polarization scattering, which depolarizes the signal and causes crosstalk between the two polarization components of the signal. This effect is data dependent and occurs on a timescale of baud rate.

SUMMARY

In accordance with a particular embodiment of the present invention, a method for reducing cross-phase modulation in an optical signal includes receiving an optical signal comprising a plurality of channels, wherein the information being communicated in a first set of one or more of the channels is modulated using one or more single-polarization modulation techniques and wherein the information being communicated in a second set of one or more of the channels is modulated using one or more dual-polarization modulation techniques. The method also includes splitting the optical signal into at least a first copy of the optical signal and a second copy of the optical signal and terminating the second set of channels in the first copy. Furthermore, the method includes applying a differential group delay to the second copy, the differential group delay introducing a walk-off between symbols communicated in a first polarization component of the second set of channels and the symbols of a second polarization component of the second set of channels. In addition, the method includes terminating the first set of channels in the second copy, combining the first set of channels in the first copy and the second set of channels in the second copy, and forwarding the combined channels.

Technical advantages of one or more embodiments of the present invention may include reducing XPM by suppressing nonlinear polarization scattering (i.e., reducing the state of polarization dependence on data). This is done by time interleaving the symbols of the different polarization components of the signal (e.g., the x and y polarization components) such that the symbols do not occur at the same time. This time interleaving also reduces the signal peak power, which creates less non-linear effects. However, the use of such time interleaving is problematic when DP signals are multiplexed with SP signals. Thus, embodiments of the present invention provide architectures for applying XPM reduction in a mixed modulation network to only those channels of the signal that need XPM reduction.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
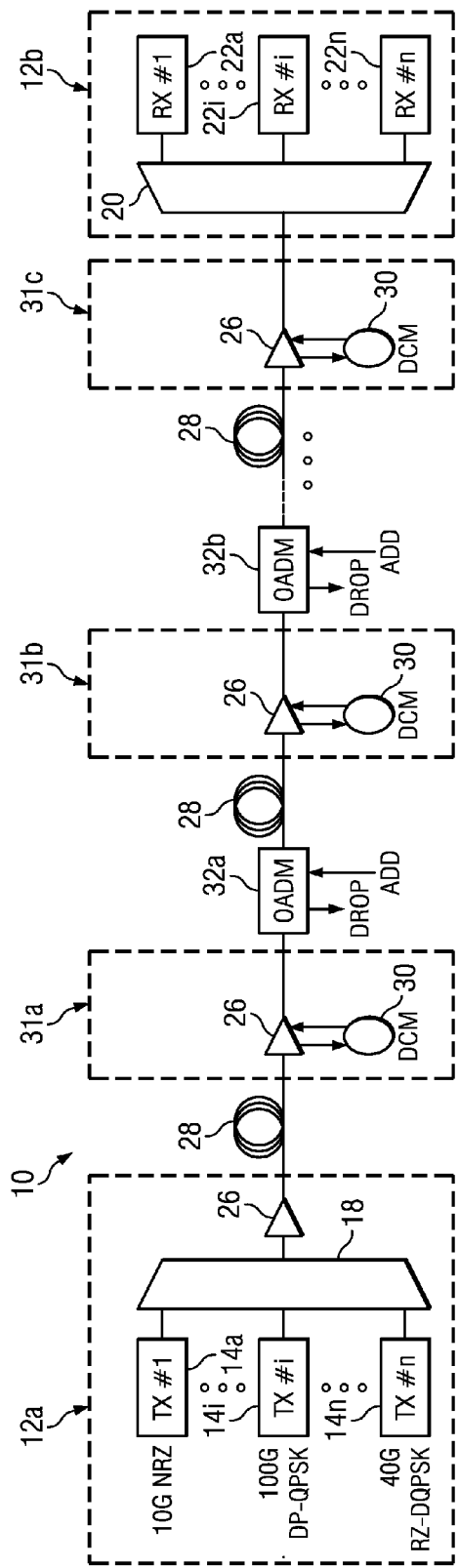
FIG. 1 is a block diagram illustrating one embodiment of an optical network carrying a signal comprising a plurality of sets of channels using different modulation formats, according to a particular embodiment of the present invention.

FIG. 1 illustrates an example optical network 10. The optical network 10 includes one or more optical fibers 28 operable to transport one or more optical signals communicated by components of the optical network 10. The components of optical network 10, coupled together by the optical fibers 28, include terminal nodes 12a and 12b and one or more optical add/drop multiplexers (OADM) 32 (for example, OADMs 32a and 32b). Although the optical network 10 is shown as a point-to-point optical network with terminal nodes, the optical network 10 may also be configured as a ring optical network, a mesh optical network, or any other suitable optical network or combination of optical networks. The optical network 10 may be used in a short-haul metropolitan network, a long-haul inter-city network, or any other suitable network or combination of networks.

Terminal node 12a includes transmitters 14, a multiplexer 18, and an amplifier 26. Transmitters 14 include any transmitter or other suitable device operable to transmit optical signals. Each transmitter 14 is operable to receive information and to modulate one or more wavelengths of light to encode the information on the wavelength. In optical networking, a wavelength of light is also referred to as a channel. Each transmitter 14 is also operable to transmit this optically encoded information on the associated wavelength. As discussed below, transmitters 14 may transmit signals having different data rates and different modulation formats. The multiplexer 18 includes any multiplexer or combination of multiplexers or other devices operable to combine different channels into one signal. Multiplexer 18 is operable to receive and combine the disparate channels transmitted by transmitters 14 into an optical signal for communication along fibers 28.

Amplifier 26 may be used to amplify the multi-channeled signal. Amplifier 26 may be positioned before and/or after certain lengths of fiber 28. Amplifier 26 may comprise an optical repeater that amplifies the optical signal. This amplification may be performed without opto-electrical or electro-optical conversion. In particular embodiments, amplifier 26 may comprise an optical fiber doped with a rare-earth element. When a signal passes through the fiber, external energy is applied to excite the atoms of the doped portion of the optical fiber, which increases the intensity of the optical signal. As an example, amplifier 26 may comprise an erbium-doped fiber amplifier (EDFA). However, any other suitable amplifier 26 may be used.

The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring back to FIG. 1, the terminal node 12a in optical network 10 is operable to transmit and multiplex disparate channels using WDM, DWDM, or some other suitable multi-channel multiplexing technique, and to amplify the multi-channel signal.

As discussed above, the amount of information that can be transmitted over an optical network varies directly with the number of optical channels coded with information and multiplexed into one signal. Therefore, an optical signal employing WDM may carry more information than an optical signal carrying information over solely one channel. An optical signal employing DWDM may carry even more information. Besides the number of channels carried, another factor that affects how much information can be transmitted over an optical network is the bit rate of transmission. The greater the bit rate, the more information may be transmitted.

Improvements and upgrades in optical network capacity generally involve either increasing the number of wavelengths multiplexed into one optical signal or increasing bit rates of information traveling on each wavelength. In either case, it is usually more cost-efficient to use, modify, or add to existing network components than to replace the entire optical system. For reasons relating to the cost of upgrading an optical system, upgrades sometimes occur in stages in which the network must support both new technologies that provide greater bandwidth and old technologies that provide less bandwidth.

Many existing networks transmit information at ten gigabits per second (GB/s) and modulate the information using, for example, a non-return-to-zero (NRZ) modulation technique. Signal transmission upgrades from such ten GB/s transmitters have included, for example, transmitting information at forty GB/s using differential phase shift keying (DPSK) or differential quadrature phase shift keying (DQPSK) to modulate the optical signal. For example, such signals may be modulated using RZ-QPSK or RZ-DQPSK modulation. Furthermore, one hundred GB/s transmitters are also being introduced into optical networks. While ten and forty GB/s signals are often modulated using a single polarization modulation technique, one hundred GB/s signals may be modulated using a dual polarization modulation technique, such as DP-QPSK.

Since upgrading the entire optical network's transmitters would be cost-prohibitive for most optical network operators, many such operators instead desire to upgrade their networks by incrementally replacing existing ten GB/s NRZ transmitters with forty GB/s DPSK or DQPSK transmitters and with one hundred GB/s DP-QPSK transmitters (these types of transmitters being used only as examples). Thus, these upgraded networks eventually include a mix of ten, forty and one hundred GB/s transmitters.

One challenge faced by those wishing to implement the cost-efficient strategy of integrating upgraded transmitters with existing transmitters is the challenge of reducing XPM in the DP signals of the network. Systems that employ both upgraded transmitters sending DP signals and existing transmitters sending SP signals need a mechanism to provide XPM reduction for only the DP.

Referring back to the example embodiment in FIG. 1, the WDM signal generated by node 12a includes sets of channels using different modulation formats and having different bit rates. In particular, the WDM signal comprises a set of channels communicating information at ten GB/s using NRZ modulation (sent by transmitter(s) 14a), a set of channels communicating information at forty GB/s using RZ-DQPSK modulation (sent by transmitter(s) 14n), and a set of channels communicating information at one hundred GB/s using DP-QPSK modulation (sent by transmitter(s) 14i). However, the sets of disparate channels may communicate information at any suitable bit rate and/or using any suitable modulation technique. For example, one or more of the channels may communicate information at a rate of ten, twenty, forty, eighty, over eighty GB/s, or any other suitable bit rate. One or more of the channels may additionally communicate information using a modulation technique such as return-to-zero (RZ), carrier suppressed return-to-zero (CS-RZ), NRZ, DPSK, DQPSK, or any other suitable modulation technique. As used herein, a "set" of channels may include one or more channels and does not imply any spatial or any other unspecified relationship among the channels (for example, the channels in a set need not be contiguous). In addition, as used herein, "information" may include any information communicated, stored, or sorted in the network. This information may have at least one characteristic modulated to encode audio, video, textual, real-time, non-real-time and/or other suitable data. Additionally, information communicated in optical network 10 may be structured in any appropriate manner including, but not limited to, being structured as frames, packets, or an unstructured bit stream.

After the multi-channel, mixed polarization signal (which includes a mix of SP and DP signals) is transmitted from terminal node 12a, the signal travels over optical fibers 28 to optical dispersion compensation modules (DCMs) 31 and OADMs 32. The optical fibers 28 may include, as appropriate, a single, unidirectional fiber; a single, bi-directional fiber; or a plurality of uni- or bi-directional fibers. Although this description focuses, for the sake of simplicity, on an embodiment of the optical network 10 that supports unidirectional traffic, the present invention further contemplates a bi-directional system that includes appropriately modified embodiments of the components described below to support the transmission of information in opposite directions along the optical network 10.

DCMs 31 include an amplifier 26 and associated optical dispersion compensating fiber 30. As discussed above, amplifiers 26 may be used to amplify the WDM signal as it travels through the optical network 10. DCMs 31 include any dispersion compensating fiber or other dispersion compensating device operable to perform optical dispersion compensation on a signal or set of channels comprising a signal that use one modulation technique. In alternative embodiments, for a signal comprising channels using different modulation techniques and different data rates, dispersion compensation components may be included within OADMs 32 and may perform compensation selectively (and differently) on the different channels. Examples of such an implementation of the DCM in an OADM are disclosed in co-pending U.S. patent application Ser. No. 12/723,156, entitled "Method and System for Compensating for Optical Dispersion in an Optical Signal."

OADMs 32 may include any device or combination of devices operable to add and/or drop optical signals from fibers 28. OADMs 32 may also include any device or combination of devices operable to reduce XPM in the DP signals, while not performing any such reduction for SP signals (where such reduction is unneeded and counter-productive). Such XPM reduction components of OADMs 32 are described more fully below in conjunction with FIG. 4.

After a signal passes through OADMs 32, the signal may travel along fibers 28 directly to terminal node 12b, or the signal may be passed through one or more additional OADMs 32 (such as OADM 32b, for example) before reaching terminal node 12b. Terminal node 12b is operable to receive signals transmitted over optical network 10. Terminal node 12b includes a demultiplexer 20 and receivers 22. Demultiplexer 20 includes any demultiplexer or other device operable to separate the disparate channels multiplexed using WDM, DWDM, or other suitable multi-channel multiplexing technique. Demultiplexer 20 is operable to receive an optical signal carrying a plurality of multiplexed channels, demultiplex the disparate channels in the optical signal, and pass the disparate channels to different receivers 22.

Receivers 22 include any receiver or other suitable device operable to receive an optical signal. Each receiver 22 is operable to receive a channel of an optical signal carrying encoded information and demodulate the information into an electrical signal. These channels received by receivers 22 may include the channels transmitted by transmitters 14 and/or channels added by OADMs 32. For example, receiver(s) 22a may be configured to receive the ten GB/s NRZ signal sent by transmitter(s) 14a, receiver(s) 22n may be configured to receive the forty GB/s RZ-DQPSK signal sent by transmitter(s) 14n, and receiver(s) 22i may be configured to receive the one hundred GB/s DP-QPSK signal sent by transmitter(s) 14i.

In operation, transmitters 14 of terminal node 12a transmit information at different bit rates and/or using different modulation techniques over different channels. Such channels include and mix of SP and DP signals. The multiplexer 18 combines these different channels into an optical signal and communicates the signal over optical fiber 28. An amplifier 26 receives the optical signal, amplifies the signal, and passes the signal over optical fiber 28.

After (and if) the DCM 31a performs optical dispersion compensation on the signal and forwards the signal, the first OADM 32 of receives the signal. After receiving the optical signal, the OADM 32 may drop channels from the optical signal and/or add channels to the optical signal. The OADM 32 also performs XPM reduction on the DP channels. In the example embodiment of FIG. 1, the OADM 32 performs XPM reduction for the one hundred GB/s DP-QPSK channels, but not for the SP channels, as discussed below. The OADM 32 then forwards a signal comprising the received channels (some of which XPM reduction has been performed) and one or more of the added channels (if channels are added by the OADM 32). There may be one or more OADMs 32 in example optical network 10.

After the signal passes through the one or more OADMs 32 (such as, for example, OADMs 32a and 32b), the terminal node 12b receives the forwarded signal The demultiplexer 20 of terminal node 12b receives the signal, demultiplexes the signal into the signal's constituent channels, and passes the signal's constituent channels. Each channel is received by an associated receiver 22 of terminal node 12b.

As noted above, although the optical network 10 is shown as a point-to-point optical network with terminal nodes, the optical network 10 may also be configured as a ring optical network, a mesh optical network, or any other suitable optical network or combination of optical networks.

It should be noted that although particular components have been shown, modifications, additions, or omissions may be made to the optical network 10 without departing from the scope of the invention. The components of the optical network 10 may be integrated or separated according to particular needs. Moreover, the operations of the optical network 10 may be performed by more, fewer, or other components.

Figure 2:
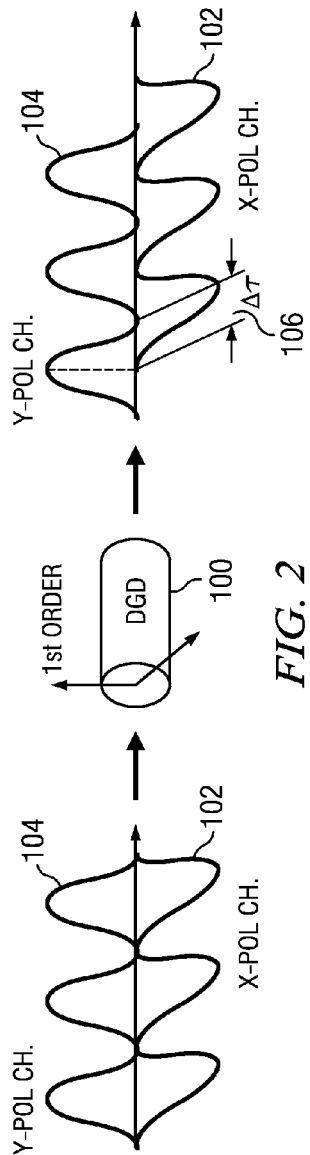
FIG. 2 is an illustration of an example technique for providing cross-phase modulation reduction in a dual polarization signal, according to a particular embodiment of the present invention.

FIG. 2 is an illustration of an example technique for providing XPM reduction in a DP signal. More specifically, a first order differential group delay (DGD) module 100 may be used to time interleave the symbols of the two polarization states such that the symbols do not occur at the same time. As noted above, this reduces XPM by suppressing nonlinear polarization scattering (i.e., reducing the state of polarization dependence on data). More specifically, the DGD module 100 may de-correlate the X-polarization component 102 and Y-polarization component 104 of a signal by introducing a walk-off 106 ($\Delta\tau$) between them. This walk-off 106 is introduced by applying a first order DGD to one of the polarization components.

Figure 3A:
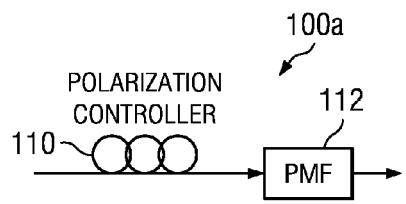
FIGS. 3A and 3B are block diagrams illustrating example configurations of a differential group delay module, according to particular embodiments of the present invention.
Figure 3B:
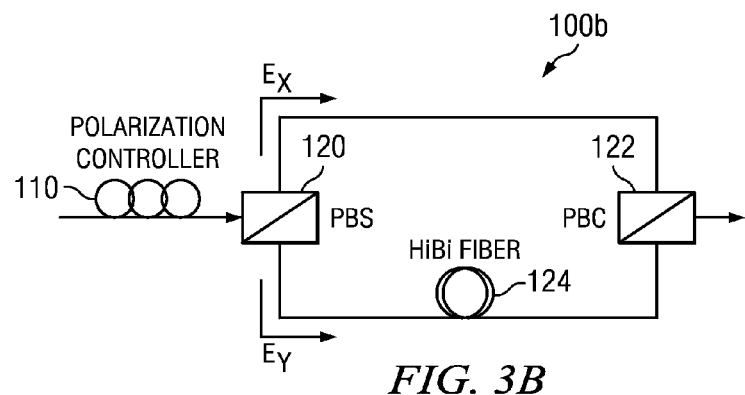

FIGS. 3A and 3B are block diagrams illustrating example configurations of DGD module 100. DGD module 100 may be implemented in a number of different configurations. FIG. 3A illustrates one such configuration, DGD module 100a. DGD module 100a includes a polarization controller 110 followed by a polarization maintaining fiber (PMF) 112. Alternatively, the PMF 112 could be replaced by a set of waveplates or by a high birefringence (HiBi) fiber. A PMF is designed to introduce large amount of the birefringence without small random fluctuations. PMF 112 is a fiber whose symmetry is so strongly broken (i.e., a highly elliptical core) that an input polarization along a principal axis is maintained all the way to the output. It provides pure first order DGD without higher order polarization mode dispersion. In order to use PMF 112 (or another type of DGD component such a waveplates or HiBi fiber), polarization controller 110 may be positioned in front of PMF 112 to set the state of polarization of the signal at forty-five degrees to yield the splitting of the signal within PMF 112 into, for example, $E_x$ (x-polarization) and $E_y$ (y-polarization).

FIG. 3B illustrates another configuration for DGD module 100, DGD module 100b. DGD module 100b includes a polarization controller 110 followed by a polarization beam splitter (PBS) 120. PBS 120 separates the input signal into two orthogonally polarized beams, for example, $E_x$ and $E_y$, components. Then, a variable optical delay can be applied to one of the polarization components using a HiBi fiber 124 or any other suitable DGD component. The $E_x$ and $E_y$ components are then recombined using polarization beam combiner (PBC) 122.

As discussed above, although DGD modules are effective in addressing XPM in a DP signal, such a DGD should not be introduced to SP channels that are multiplexed with the DP channels. Thus, an architecture is needed to address mixed signal systems.

Figure 4:
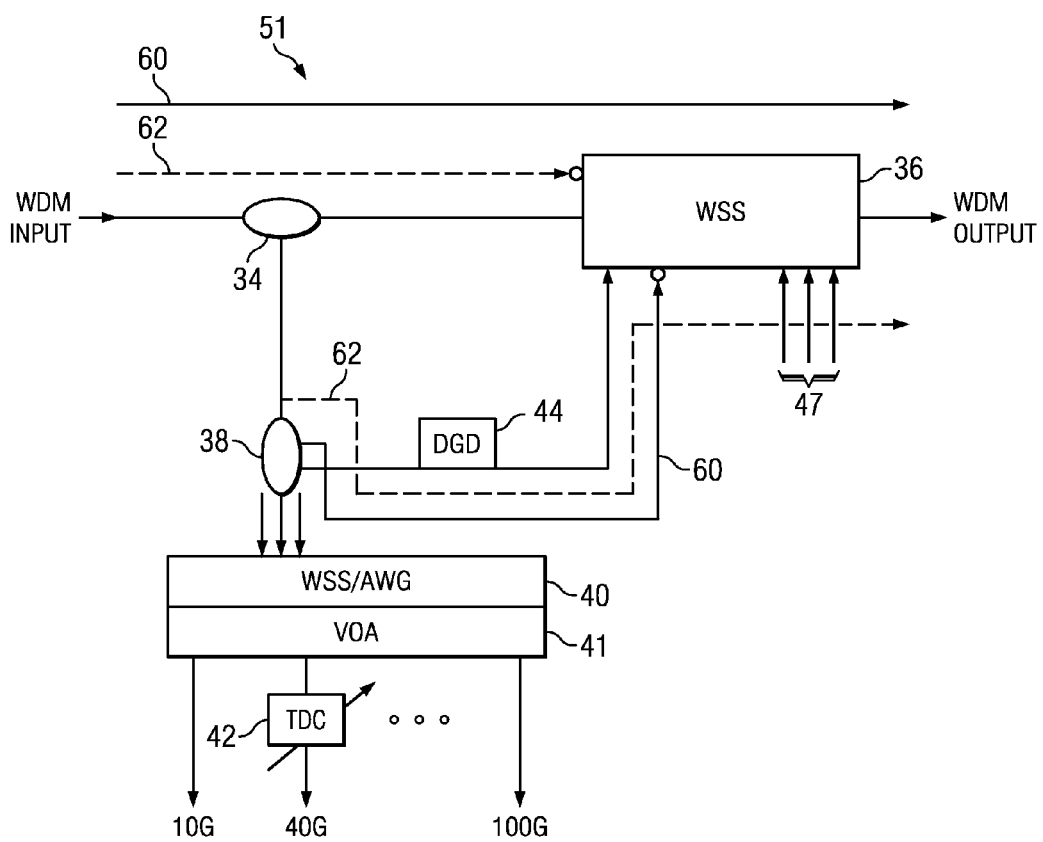
FIG. 4 is a block diagram illustrating an optical add/drop multiplexer of the network of FIG. 1 that provides cross-phase modulation reduction, according to a particular embodiment of the present invention.

FIG. 4 is a block diagram illustrating an OADM 51 (which is one example of an OADM 32 of the network of FIG. 1) that compensates for optical dispersion according to a particular embodiment of the present invention. OADM 51 is operable to receive an optical signal on the optical network 10, and, as described below, perform XPM reduction for just the DP channels of the optical signal. OADM 51 may include couplers 34 and 38, a wavelength selective switch (WSS) 36, a demultiplexer 40 with an associated variable optical attenuator (VOA) 41, tunable dispersion compensators (TDCs) 42, and DGD module 44.

Couplers 34 and 38 may comprise an optical fiber coupler or other optical component operable to split an optical signal into multiple copies. Couplers 34 and 38 are operable to split an optical signal into two copies of the optical signal. The WSS 36 may comprise any WSS or other device operable to receive multiple optical signals, demultiplex each signal into the signal's constituent channels, terminate zero, one or more channels received, multiplex the remaining channels and any added channels, and pass the multiplexed signal along the optical network 10.

The demultiplexer 40 may comprise any device operable to receive an optical signal and demultiplex the channels in the optical signal. For example, the demultiplexer 40 may be a WSS or an arrayed waveguide grating (AWG). However, any other suitable demultiplexer 40 may be used. The VOA 41 may comprise a VOA or any other device operable to balance power levels of output channels. TDCs 42 may comprise any device operable to compensate for optical dispersion. Although tunable devices are described, any other suitable compensation devices may be used.

DGD module 44 is any suitable component configured to introduce a walk-off between the different polarization components of a DP signal. For example, DGD module 44 may comprise modules 100a or 100b of FIGS. 3A and 3B or any other suitable component.

In operation, the first coupler 34 receives the optical signal from network 10. The optical signal, in this example, includes ten GB/s and forty GB/s SP channels (channels 60) and one hundred GB/s DP channels (channels 62). However, any other bit rate signals may be communicated. Coupler 34 splits the optical signal into two copies, passes the first copy to WSS 36, and drops the second copy to coupler 38. The WSS 36 receives the first copy and terminates the DP channels 62 (because XPM reduction will be applied to those channels at the node), allowing the SP channels 60 to pass (because they do not need XPM reduction).

The second coupler 38 receives the second copy, splits the second copy into two additional copies (a third copy and a fourth copy), drops the third copy to demultiplexer 40, and passes the fourth copy to DGD module 44. The demultiplexer 40 receives the third copy and separates the channels of the third copy. The VOA 41 may then attenuate the levels of the separated channels to balance the separated channels as needed. Each channel may then be dropped to an associated receiver for communication to one or more client devices of OADM 51 (or to other suitable destinations), or may be terminated. The ten GB/s and one hundred GB/s channels may be dropped directly to an associated receiver(s) of OADM 51 since these channels are fully compensated by the in-line DCMs 31 in network 10 (at least in this example). However, any forty GB/s channels that are to be dropped may need further compensation. Therefore, a separate TDC 42 may receive each forty GB/s channel that is dropped, complete optical dispersion compensation for each forty GB/s channel, and forward the forty GB/s channel to an associated receiver.

The DGD module 44 receives the fourth copy, applies a walk-off to the polarization components of the DP channels 62, and forwards the fourth copy to the WSS 36. It should be noted that SP channels 60 also go through DGD module 44 because they are part of the fourth copy. The WSS 36 receives the fourth copy, terminates the SP channels 60 (because XPM reduction in DGD module 44 is not appropriate for such channels), and combines the XPM-reduced DP channels 62 with the SP channels 60 from the first copy of the signal received from coupler 34. However, the WSS 36 may terminate particular DP channels 62 received from DGD module 44 if the OADM 51 is a destination node for the channel and/or if traffic is being added at OADM 51 in that channel (as indicated by arrows 47). The WSS 36 may also add traffic originating from OADM 51 in one or more of the SP channels 60 (in which case these channels in the first copy are terminated). The WSS 36 then forwards the new optical signal comprising the SP channels 60 and the XPM-reduced channels 62 and any added channels on network 10.

Modifications, additions, or omissions may be made to the network 100 described without departing from the scope of the invention. The components of the network 100 described may be integrated or separated according to particular needs. Moreover, the operations of the network 100 may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed is:

1. A method for reducing cross-phase modulation in an optical signal, comprising:

receiving an optical signal comprising a plurality of channels, wherein the information being communicated in a first set of one or more of the channels is modulated using one or more single-polarization modulation techniques and wherein the information being communicated in a second set of one or more of the channels is modulated using one or more dual-polarization modulation techniques;

splitting the optical signal into at least a first copy of the optical signal and a second copy of the optical signal;

terminating the second set of channels in the first copy;

applying a differential group delay to the second copy, the differential group delay introducing a walk-off between symbols communicated in a first polarization component of the second set of channels and the symbols of a second polarization component of the second set of channels;

terminating the first set of channels in the second copy; and combining the first set of channels in the first copy and the second set of channels in the second copy and forwarding the combined channels.

2. The method of claim 1, wherein:
the information being communicated in the first set of channels is communicated at one or both of 10 GB/s and 40 GB/s; and
the information being communicated in the second set of channels is communicated at 100 GB/s.

3. The method of claim 1, wherein:
the first set of channels are modulated using one or both of non-return-to-zero modulation and return-to-zero phase-shift keying modulation; and
the second set of channels are modulated using dual polarization phase-shift keying modulation.

4. The method of claim 1, applying a differential group delay to the second copy comprises:
adjusting the state of polarization of the signal using a polarization controller; and
passing the adjusted signal through a polarization maintaining fiber.

5. The method of claim 1, applying a differential group delay to the second copy comprises:
adjusting the state of polarization of the signal using a polarization controller;
splitting the signal into the first polarization component and the second polarization component;
passing the first polarization component through a high birefringence (HiBi) fiber; and
combining the first polarization component back with the second polarization component after passing the first polarization component through the HiBi fiber.

6. The method of claim 1, further comprising:
before applying a differential group delay to the second copy, splitting the second copy into a third copy and a fourth copy, wherein the differential group delay is applied to the fourth copy;
demultiplexing the channels of the third copy; and
forwarding one or more of the demultiplexed channels of the third copy to one or more optical receivers.

7. The method of claim 6, further comprising, after demultiplexing the channels of the third copy, performing dispersion compensation on one or more of the channels before forwarding such channels to an optical receiver.

8. A system for reducing cross-phase modulation in an optical signal, wherein the information being communicated in a first set of one or more of the channels is modulated using one or more single-polarization modulation techniques and wherein the information being communicated in a second set of one or more of the channels is modulated using one or more dual-polarization modulation techniques, the system comprising:
a coupler configured to split the optical signal into at least a first copy of the optical signal and a second copy of the optical signal;
a differential group delay module configured to apply a differential group delay to the second copy, the differential group delay introducing a walk-off between symbols communicated in a first polarization component of the second set of channels and the symbols of a second polarization component of the second set of channels; and
a switch configured to:
receive the first copy from the coupler and terminate the second set of channels in the first copy;
receive the second copy from the differential group delay module and terminate the first set of channels in the second copy;
combine the first set of channels in the first copy and the second set of channels in the second copy;
forward the combined channels.

9. The system of claim 8, wherein:
the information being communicated in the first set of channels is communicated at one or both of 10 GB/s and 40 GB/s; and
the information being communicated in the second set of channels is communicated at 100 GB/s.

10. The system of claim 8, wherein:
the first set of channels are modulated using one or both of non-return-to-zero modulation and return-to-zero phase-shift keying modulation; and
the second set of channels are modulated using dual polarization phase-shift keying modulation.

11. The system of claim 8, wherein the differential group delay module comprises:
a polarization controller configured to adjust the state of polarization of the signal; and
a polarization maintaining fiber configured to receive the signal from the polarization controller.

12. The system of claim 8, wherein the differential group delay module comprises:
a polarization controller configured to adjust the state of polarization of the signal;
a polarization beam splitter configured to receive the signal from the polarization controller and split the signal into the first polarization component and the second polarization component;
a high birefringence (HiBi) fiber configured to receive the first polarization component from the polarization beam splitter; and
a polarization beam combiner configured to receive the first polarization component after passing through the HiBi fiber, receive the second polarization component from the polarization beam splitter, and combine the received first and second polarization components.

13. The system of claim 8, further comprising:
a second coupler configured to split the second copy into a third copy and a fourth copy, wherein the differential group delay is applied to the fourth copy; and
a demultiplexer configured to demultiplex the channels of the third copy and forward one or more of the demultiplexed channels of the third copy to one or more optical receivers.

14. The system of claim 13, further comprising one or more dispersion compensation devices each operable to receive a channel from the demultiplexer and perform dispersion compensation on the channel before forwarding the channel to an optical receiver.

* * * * *